Feb. 19, 1946. R. S. BUCK ET AL 2,395,097
SHAFT COOLING
Filed May 11, 1943
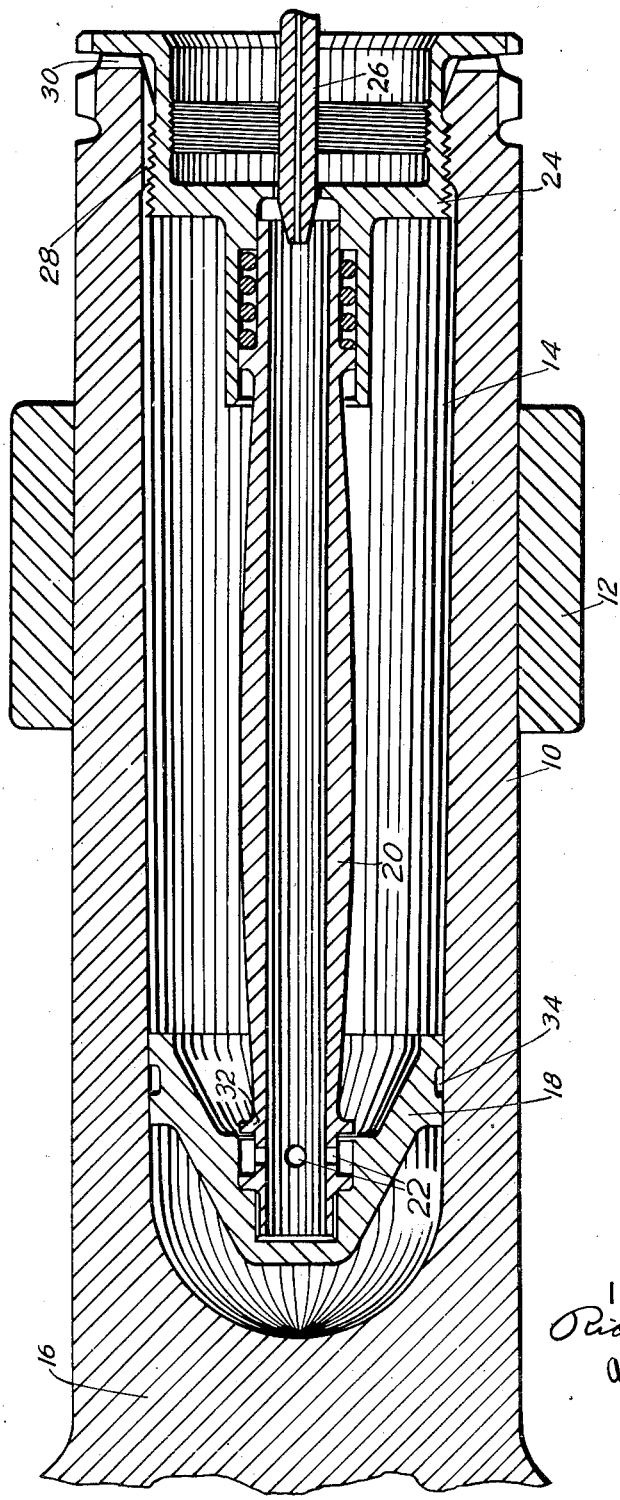
INVENTORS
Richard S. O Buck
Andrew Kalitinsky

UNITED STATES PATENT OFFICE 2,395,097

SHAFT COOLING

Richard S. Buck, Glastonbury, and Andrew Kalitinsky, Eagleville, Conn., assignors to United Aircraft Corporation, East Hartford, Conn., a corporation of Delaware Application May 11, 1943, Serial No. 486,609

12 Claims. (Cl. 308—77)

This invention relates to the cooling of a turbine shaft.

Where the turbine shaft has been cooled by a circulation of air through the shaft, caused by centrifugal force in radially extending air passages, the flow of air is frequently insufficient for adequate cooling of the shaft. Where a liquid is used, direct contact between the liquid and the heated portions of the shaft may overheat the liquid to the point of vaporization or chemical breakdown.

An object of this invention is to cool the shaft without having the coolant come into direct contact with the hottest portions of the shaft.

Where the end of a turbine shaft has an inwardly extending recess into which coolant is directed, it has been customary for the coolant to reach the inner end of the recess, which is adjacent the hot power section. A feature of this invention is a baffle which prevents coolant from flowing beyond a predetermined part of the recess.

Another feature is a bearing for a turbine shaft so arranged that the portion of the shaft surrounded by the bearing is cooled, although the flow of coolant toward the power section is limited by a baffle as above mentioned. In this way the cooling action is concentrated on the section of the shaft adjacent the bearing.

Other objects and advantages will be apparent from the specification and claims, and from the accompanying drawing which illustrates what is now considered to be a preferred embodiment of the invention.

The drawing is a sectional view through the bearing and the end of the turbine shaft, showing the cooling device.

The end of turbine shaft 10, which is journaled in a bearing 12, has a recess 14 extending from the end of the shaft toward the power section 16. This power section becomes heated during operation of the turbine (especially in gas turbines), and heat is conducted along the shaft toward the bearing. The inner end of recess 14 is adjacent the power section, and the surface of the recess at this end is necessarily extremely hot.

A cup-shaped baffle 18, concentric with the shaft axis, extends across the recess, being spaced from, and out of contact with, the inner end of the recess. The inner surface of the cup is directed toward the outer end of the recess, and coolant is discharged onto that surface from a tube 20, supported at its inner end by the cup. The coolant discharges through radial openings 22 in the tube. The outer end of the tube is supported by a cap 24 which may be threaded into the open end of the recess. A nozzle 26 extends centrally through the cap and delivers coolant to the tube 20. Coolant escapes from the recess 14 through slots 28 and 30 in the outer end of the recess.

Tube 20 may have a flange 32 adjacent the inner surface of baffle to form, with the baffle surface, an annular opening through which coolant will be uniformly distributed over the surface of the baffle.

Coolant discharged onto the inner surface of the cup-shaped baffle 18 flows outwardly onto the surface of the recess 14 by centrifugal force. Since the recess increases gradually in diameter toward the open end of the shaft, centrifugal force also causes coolant on the surface of the recess to flow toward the outer end. Since the recess extends through the part of the shaft surrounded by the bearing the coolant serves to cool the part of the shaft surrounded by the bearing.

Baffle 18 may have a groove 34 in its periphery to reduce the area of contact with the surface of the recess. Heat transfer from the shaft to the baffle is lessened by the smaller contact area, and removal of the baffle is also made easier.

The area of slot or slots 28 may be such that oil will accumulate in the recess to form a film of oil of substantial depth on the surface of the recess.

It is to be understood that the invention is not limited to the specific embodiment herein illustrated and described, but may be used in other ways without departure from its spirit as defined by the following claims.

I claim:

1. In a turbine, a shaft having a section which becomes heated during turbine operation, a bearing surrounding the shaft adjacent said section, and means for cooling the shaft adjacent the bearing, said means including a recess in the shaft adjacent the bearing, means for directing fluid to the recess, and a baffle extending across the recess to prevent flow of fluid toward said section beyond the baffle.

2. In a turbine, a shaft having a section which becomes heated during turbine operation, a bearing surrounding the shaft adjacent said section, and means for cooling the shaft adjacent the bearing, said means including an internal recess in the shaft adjacent the bearing, a baffle in the recess at a point between the bearing and said section, and means for directing coolant to the recess on the same side of the baffle as the bearing.

3. A shaft having a recess, a cup-shaped baffle between the ends of the recess, and a tube for directing fluid to the inside surface of the baffle, said tube having its inner end fitting within the baffle and having a radial opening adjacent the baffle and through which fluid is discharged onto the surface of the baffle.

4. A shaft having a recess, a cup-shaped baffle between the ends of the recess, and a tube for directing fluid to the inside surface of the baffle, said tube having its inner end fitting within the baffle, said tube and baffle being arranged to form an annular opening through which the fluid is discharged onto the surface of the baffle.

5. In shaft cooling, a rotating shaft having a recess, and a cup-shaped baffle across said recess, in combination with means for directing coolant to the inside surface of the baffle, said recess increasing in diameter from the baffle to the open end.

6. A shaft having a recess, a cup-shaped baffle between the ends of the recess, said recess increasing in diameter from the baffle to the open end of the recess, and a tube for directing fluid to the inside surface of the baffle, said tube having its inner end fitting within the baffle and having a radial opening adjacent the baffle and through which fluid is discharged onto the surface of the baffle.

7. A shaft having a heated section, and a bearing surrounding said shaft adjacent the heated section, said shaft having a recess in the part of the shaft surrounded by the bearing, in combination with a baffle extending across the recess at a point between the bearing and the heated section of the shaft for preventing fluid from contacting with the surface of the recess adjacent the heated section, and means for delivering fluid to the surface of said baffle, said baffle directing fluid onto the surface of the recess in that part of the shaft surrounded by the bearing.

8. A rotating shaft, a bearing surrounding a part of said shaft, said shaft having a recess in the part of the shaft surrounded by the bearing, and a cup-shaped baffle across said recess and substantially concentric to the shaft axis, in combination with means for delivering fluid to the inside surface of the baffle to cause a flow of fluid over the surface of the recess within the part of the shaft surrounded by the bearing.

9. A rotating shaft, a bearing surrounding a part of the shaft, said shaft having a recess extending through the part of the shaft surrounded by the bearing, a cup-shaped baffle across said recess, and a tube substantially axially of the shaft for delivering fluid to the inside surface of the baffle, said tube having at least one radial opening adjacent the baffle through which fluid is discharged to cause flow of fluid over the surface of the recess within the part of the shaft surrounded by the bearing.

10. A shaft having a recess, a baffle across said recess, a tube for delivering fluid to the surface of the baffle, and a cap at the end of the recess, said tube being supported at its ends by the baffle and cap, and said tube and baffle being arranged to form an annular opening through which the fluid is discharged onto the surface of the baffle.

11. A shaft having a recess with an open end, a cup-shaped baffle between the ends of the recess, a tube extending substantially axially of the shaft for directing fluid to the inside surface of the baffle, said tube having its inner end fitting within the baffle, and having a radial opening through which fluid is discharged onto the surface of the baffle, and a cap at the open end of the recess for supporting the other end of the tube.

12. A shaft having a recess with an open end, a cup-shaped baffle between the ends of the recess, a tube for directing fluid to the inside surface of the baffle, said tube having its inner end fitting within the baffle, said tube and baffle being arranged to form an annular opening through which the fluid is discharged onto the surface of the baffle, and a cap at the open end of the recess for supporting the other end of the tube.

RICHARD S. BUCK.
ANDREW KALITINSKY.